United States Patent
Konishi et al.

(10) Patent No.: US 6,281,642 B1
(45) Date of Patent: Aug. 28, 2001

(54) BALLAST FOR A DISCHARGE LAMP WITH FALSE DEACTIVATION DETECTION

(75) Inventors: Hirofumi Konishi, Hirakata; Toshiaki Nakamura, Kadoma; Kazunori Kidera, Matsubara, all of (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/503,086

(22) Filed: Feb. 14, 2000

(30) Foreign Application Priority Data

Feb. 15, 1999 (JP) .................................................. 11-036485

(51) Int. Cl.[7] .............................. H05B 37/02; G05F 1/00
(52) U.S. Cl. ......................... 315/308; 315/307; 315/362
(58) Field of Search ............................... 315/307, 224, 315/291, 225, 244, 209 R, 308, 362, 360

(56) References Cited

U.S. PATENT DOCUMENTS

| | | | |
|---|---|---|---|
| 5,880,563 | 3/1999 | Toyama et al. ........................ | 315/225 |
| 5,973,457 | * 10/1999 | Yamashita et al. .................... | 315/307 |
| 6,008,592 | * 12/1999 | Ribarich ................................ | 315/307 |
| 6,087,776 | * 7/2000 | Yamashita et al. .................... | 315/307 |

* cited by examiner

Primary Examiner—Don Wong
Assistant Examiner—Wilson Lee
(74) Attorney, Agent, or Firm—Oblon, Spivak, McClelland, Maier & Neustadt, P.C.

(57) ABSTRACT

A ballast for a discharge lamp capable of reliably and successfully detecting the end of the lamp life and ceasing the ballast immediately upon detection of the lamp's life end. The ballast includes a power supply providing from a power source a variable power to the lamp, and a power controller controlling the power supply to apply a high voltage for igniting the lamp and subsequently apply a predetermined power for operating the lamp. A lamp life detector is included in the ballast to detect whether or not the lamp comes to a lamp's life end. Also included in the ballast is a supervisor which issues, upon detection of the lamp's life end, a disable signal prohibiting the power supply from lighting the discharge lamp. The power controller provides a detection period of a limited short time period starting from energization of the ballast such that the lamp life detector can detect the lamp's life end and issue a lamp's life end signal only when there is an extinction of lamp within the detection period, and that the supervisor issues, after the elapse of the detection period, an enable signal permitting the power supply to ignite the discharge lamp if the lamp is extinguished after the elapse of the detection period.

20 Claims, 4 Drawing Sheets

BALLAST FOR A DISCHARGE LAMP WITH FALSE DEACTIVATION DETECTION

BACKGROUND OF THE INVENTION

1. Field of the Invention

The present invention relates to a ballast for a discharge lamp, and more particularly to an electronic ballast suitable for operating the discharge lamp utilized as a vehicular headlamp.

2. Description of the Prior Art

It is known that the discharge lamp will flicker repeatedly when coming near the end of the lamp life, resulting in an unreliable lamp operation as well as posing a stress to the ballast. In order to avoid this problem, U.S. Pat. No. 5,880,563 proposes to cease operating the lamp upon detecting the end of the lamp life. In this patent, the lamp flickering is monitored so as to determine the end of the lamp life when the number of the flickering out, i.e., unforced extinction of lamp exceeds a predetermined number. However, the scheme allows the lamp to flicker for some time period before ceasing the ballast, leaving an unstable lamp operation for some time period between the initial lamp extinction and the actual ceasing of the ballast. Thus, unreliable lamp operation still continues at the end of the lamp life, detracting from the safe lamp operation as well as still posing a stress to the ballast.

SUMMARY OF THE INVENTION

In view of the above problem, the present invention has been accomplished to provide a ballast for a discharge lamp which is capable of reliably and successfully detecting the end of the lamp life and ceasing the ballast immediately upon detection of the lamp's life end. The ballast of the present invention comprises a power supply providing from a power source a variable power to the discharge lamp, and a power controller which controls the power supply to apply a high voltage for igniting the lamp and subsequently apply a predetermined power for operating the lamp. A lamp life detector is included in the ballast to detect whether or not the lamp comes to a lamp's life end. Also included in the ballast is a supervisor which issues, upon detection of the lamp's life end, a disable signal prohibiting the power supply from lighting the discharge lamp. The characterizing feature of the ballast resides in that the power controller provides a detection period of a limited short time period starting from energization of the ballast such that the lamp life detector can detect the lamp's life end and issue a lamp's life end signal only when there is an extinction of lamp within the detection period, and that the supervisor issues, after the elapse of the detection period, an enable signal permitting the power supply to ignite the discharge lamp if the lamp is extinguished after the elapse of the detection period. The present invention is based upon the finding that the lamp coming its end of life will normally extinct within a short time after being ignited, while there is possibility of another lamp extinction which is not due to the lamp's life end but due to other reasons such as lowered input power or unstable arc discharge caused by physical shocks or vibrations as is seen when an automobile equipped with the lamp is running a bumpy road. Thus, according to the present invention, the lamp's life end can be reliably detected within the detection period of the limited short time, while the lamp can be successfully re-ignited if it is accidentally extinguished for the reason not due to the lamp's life end. The lamp's life end signal is issued from the lamp life detector when the power supply sees a lamp voltage above a predetermined level and/or sees a lamp current below a predetermined level.

The disable signal may be processed to cause the power supply to stop feeding the power to the discharge lamp for deenergization of the ballast. Alternatively, the disable signal may be processed to cause the power supply to shorten a period of applying the high voltage to the discharge lamp to such an extent as to fail to re-ignites the discharge lamp. Preferably, the detection period is set to range from 1 to 60 seconds, and most preferably from 1 to 10 seconds.

The power controller is preferred to provide an ignition period within which the power supply is permitted to apply the high voltage to the discharge lamp. The ignition period is set to start from the energization of the ballast and to be shorter than detection period, i.e., within the detection period. When there is acknowledged within the ignition period an event which would otherwise be detected as the lamp's life end, the lamp life detector issues no lamp life end signal, thereby avoiding a false detection of the lamp's life end at the time of igniting the lamp, and therefore assuring reliable lamp's life end detection.

Further, the ballast may be configured to include an input voltage monitor for monitoring an input voltage supplied to the power supply. Based upon the input voltage as well as operating conditions of the lamp, the power controller determines whether or not a forced lamp extinction comes from a drop in the input voltage. Thus, the power controller provides a forced lamp extinction signal indicative of that the lamp is caused to extinct due to the drop in the input voltage. Upon receiving the forced lamp extinction signal within the detection period, the supervisor acts to cancel the disable signal, thereby avoiding false deactivation of the ballast and assuring the reignition of the lamp.

These and still other objects and features of the present invention will become more apparent from the following description of the preferred embodiment when taken in conjunction with the attached drawings.

DETAILED DESCRIPTION OF THE EMBODIMENTS

Figure 1:
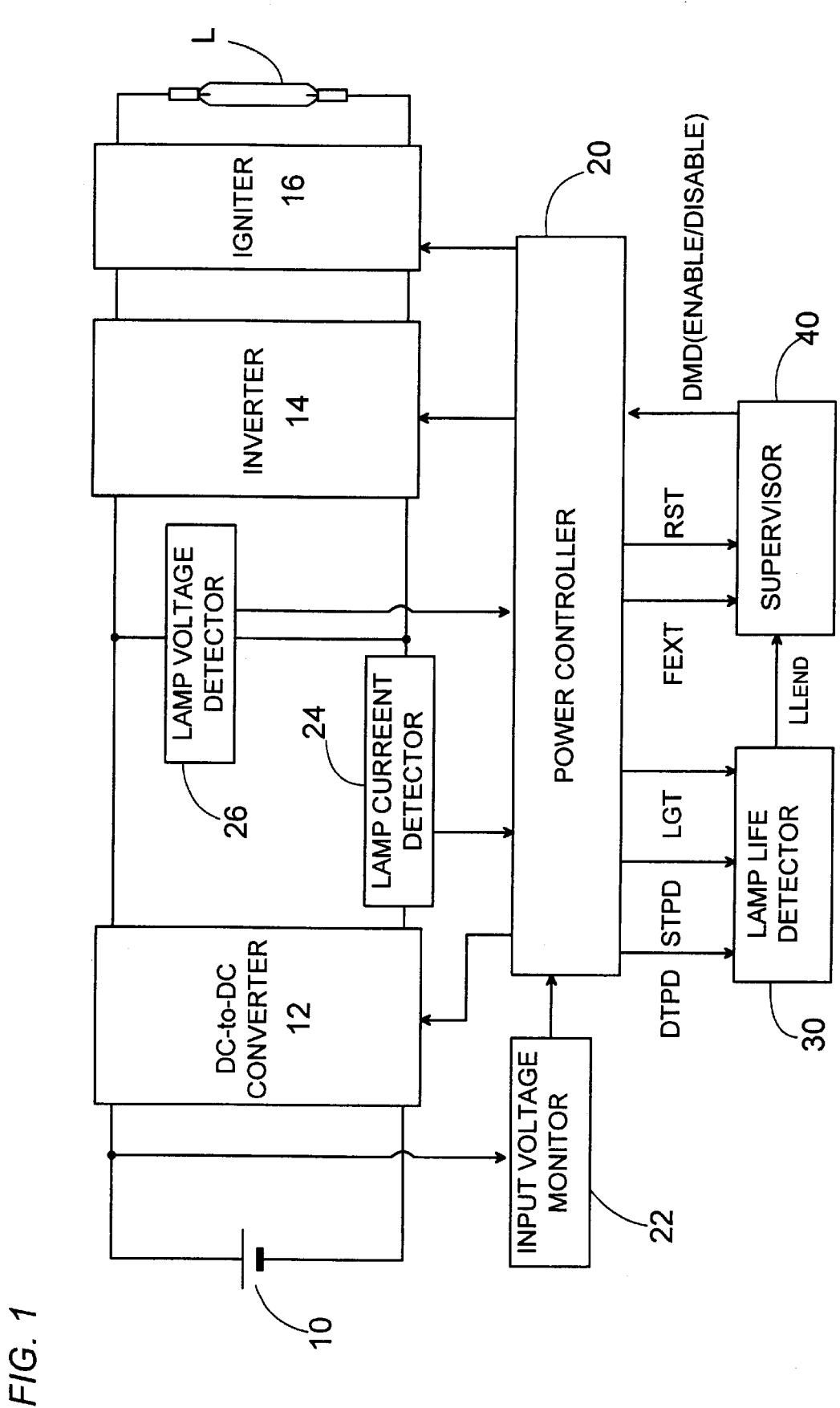
FIG. 1 is a block diagram of an electronic ballast in accordance with a first embodiment of the present invention.

Referring now to FIG. 1, there is shown a ballast in accordance with a preferred embodiment of the present invention. The discharge lamp L is high-intensity discharge lamp such as a metal halide lamp in use, for example, a headlamp of an automobile and a light source for LCD projector. The ballast comprises a DC-to-DC converter 12 which supplies an increased DC voltage from a fixed DC power source 10 such as a battery. Also included in the ballast are an inverter 14 providing an AC voltage from the increased DC voltage, and an igniter 16 providing a high voltage superimposed on the AC voltage from the inverter to ignite the discharge lamp. The DC-to-DC converter 12 is of a fly-back type having a switching element of which duty cycle is regulated by a power controller 20 to provide a boosted DC voltage. The inverter 14 is of a full-bridge type having four switching transistors which are arranged in a bridge and controlled by the power controller 20 to provide AC voltage of about 0 (or DC voltage) to several tens Hz to be applied through the igniter 16 for operating the lamp L.

The igniter 16 includes a high voltage pulse transformer for producing a pulse voltage of about 20 kV voltage which is superimposed on the voltage from the inverter for igniting the lamp.

The power controller 20 is responsible for activating the DC-to-DC converter 12, the inverter 14, and the igniter 16 in order to ignite the lamp at a high voltage from the igniter 16 and operate the lamp at a predetermined power from the inverter 14. During a run-up period immediately after ignition of the lamp, the high power as much as about twice of a rated power is firstly applied to the lamp and is subsequently reduced to the rated power. The power controller 20 is connected to an input voltage monitor 22 to constantly monitor the input voltage supplied from the DC power source 10 to the DC-to-DC converter 12. Also, the power controller 20 is connected to a lamp current detector 22 in the form of a current sensing resistor or current transformer to see a lamp current being fed to the lamp, and to a lamp voltage detector 24 to see a lamp voltage being applied to the lamp L. Thus connected power controller 20 gives functions of 1) igniting the lamp by applying the increased voltage and subsequently operating the lamp by applying the predetermined power;
2) detecting a no-load condition based upon the lamp current and the lamp voltage and deenergizing the DC-to-DC converter 12 as well as the inverter 16 upon detection of the no-load condition; and
3) detecting the lowered input voltage and the resulting extinction of the lamp and re-igniting the lamp L as soon as the input voltage restores.

Figure 3:
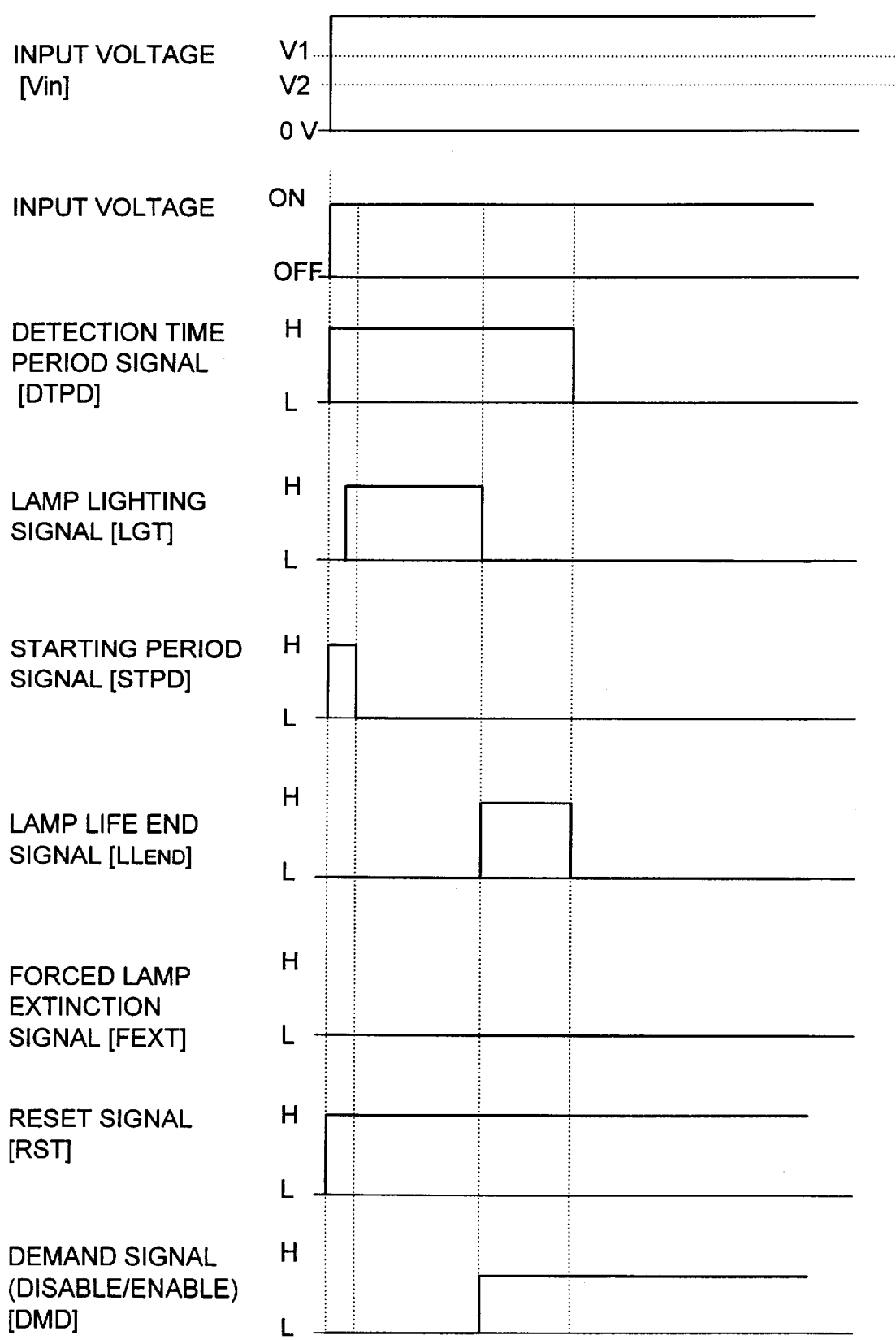
FIGS. 3 and 4 are graphs illustrating operations of the ballast.
Figure 4:
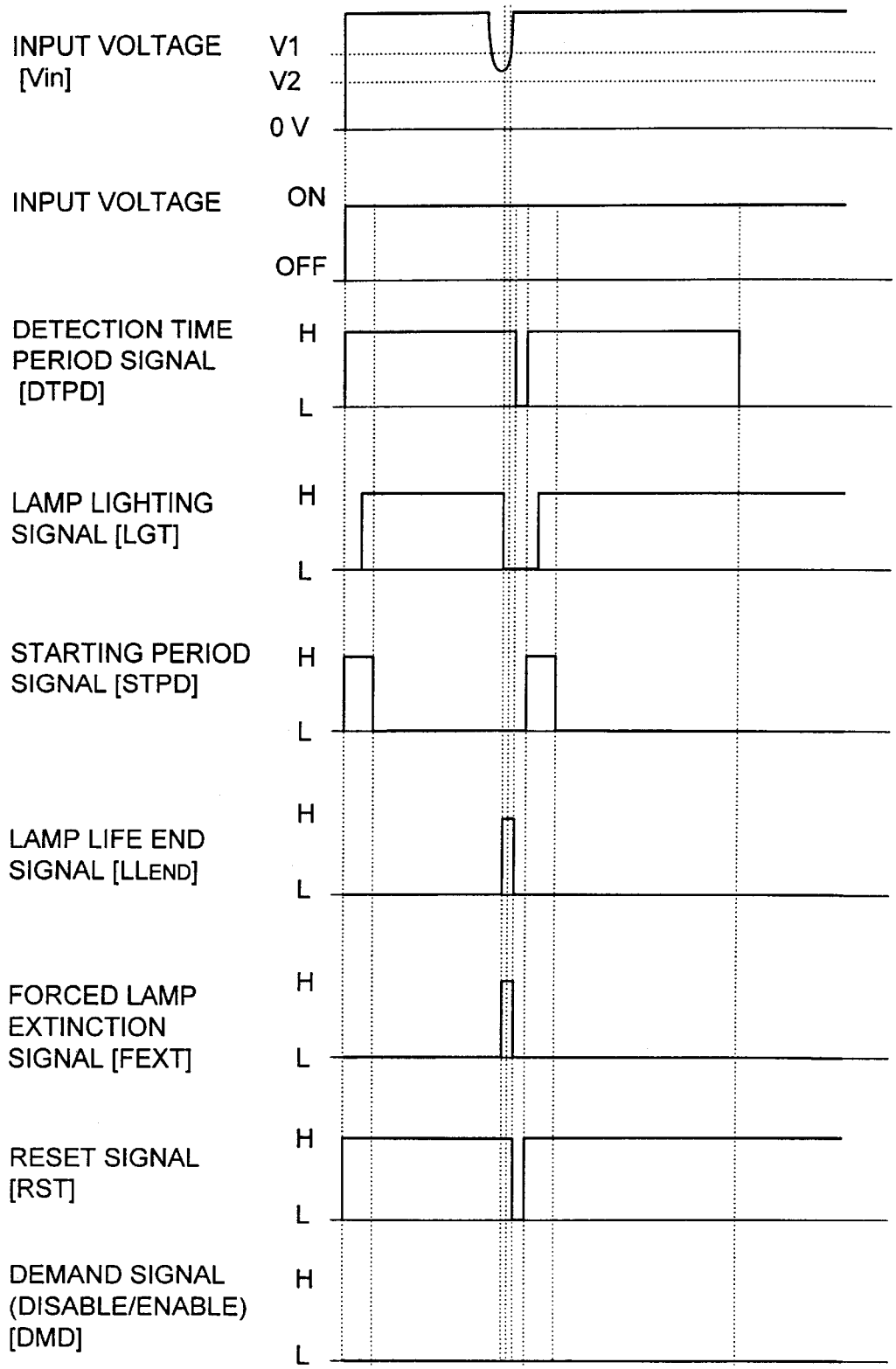

Further, the power controller 20 incorporates a timer which issues a detection time period signal DTPD and a starting time period signal STPD, as shown in FIGS. 3 and 4. The detection time period signal DTPD designates a limited short time of about 1 to 60 seconds, most preferably of 1 to 10 seconds starting from energizing the ballast for ignition of the lamp. The starting time period signal STPD designates a further shortened time period of about 0.5 to 1.0 seconds starting at the same time as the detection time period signal DTPD. The power controller 20 also issues other control signals including a lighting signal LGT indicative of whether or not the lamp L is operating, i.e., being lighted, a forced lamp extinction signal FEXT indicative of that whether or not the lamp L is extinguished due to an accidental drop in the input voltage to the DC-to-DC converter 12, and a reset signal RST, of which functions are discussed later. The lighting signal LGT goes low when the lamp voltage increases above a predetermined level and/or the lamp current decreases below a predetermined level as indicative of the extinction of the lamp.

Figure 2:
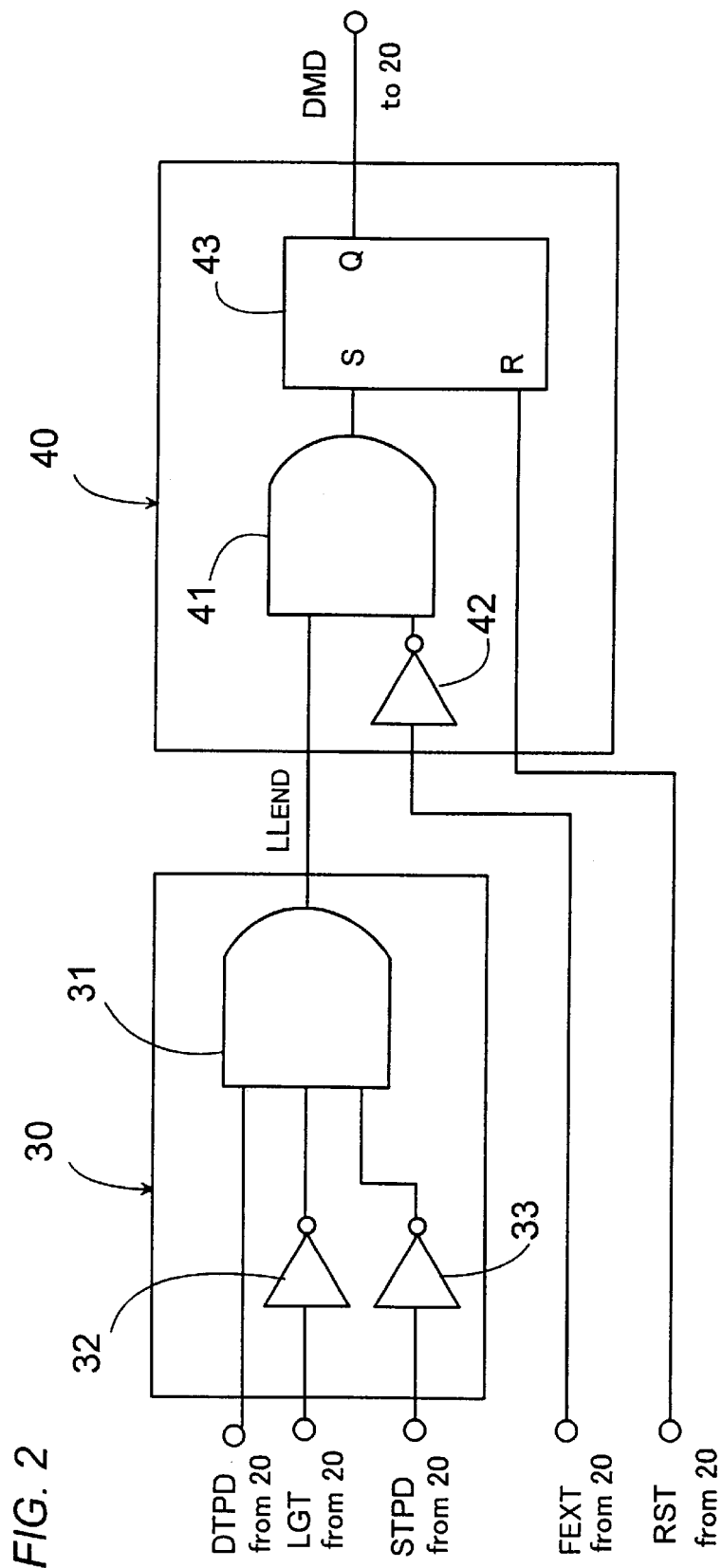
FIG. 2 is a block diagram of a lamp life detector and a lamp extinguisher of the above ballast.

The ballast further includes a lamp life detector 30 and a supervisor 40. As shown in FIGS. 1 and 2, the lamp life detector 30 is connected to receive the detection time period signal DTPD, the starting time period signal STPD, and the lighting signal LGT so as to issue a lamp's life end signal LL$_{END}$ which, as shown in FIGS. 3 and 4, goes high (H) when the lighting signal LGT goes low (L) to show a lamp extinction within a high level range of the detection time period signal DTPD. For this purpose, the lamp life detector 30 is configured to include an AND gate 31 having an input connected to receive the detection time period signal DTPD and another input connected to receive the lighting signal LGT through a NOT gate 32. Further, the AND gate 31 has a further input connected to receive the starting time period signal STPD through a NOT gate 33. Thus, the AND gate 31 issues the lamp's life end signal LL$_{END}$ which goes high (H), indicating that the lamp comes the end of the life only when the lamp is extinguished (LGT goes low) within the detection time period (DTPD is high) and not within the starting time period (STPD is low), as show in FIG. 3. This means that within the starting period (STPD is high) where LGT is kept firstly at low, the lamp life detector does not give false detection of the lamp's life, thereby assuring a reliable detection of the lamp's life end within the detection time period. That is, as soon as the lamp is extinguished within the short time period of the detection period after the starting time period, the lamp life detector 30 determines the lamp's life end and issues the lamp's life end signal LL$_{END}$.

As shown in FIG. 2, the supervisor 40 includes an AND gate 41 having an input end connected to receive the lamp's life end signal and the other input end connected to receive the forced lamp extinction signal FEXT through a NOT gate 42. The AND gate 41 has its output connected to a set input of a modified RS flip-flop 43 of which reset input is connected to receive the reset signal RST from the power controller 20. The flip-flop 43 has an output connected to the power controller 20 in order to deactivate the lamp or keep operating the lamp. That is, when the high level lamp's life end signal LL$_{END}$ is fed from the lamp life detector 30 in the absence of the high level forced lamp extinction signal FEXT, the flip-flop 43 issues a high level demand signal DMD which is a disable signal for prohibiting the lamp operation. Upon receiving the disable signal from the supervisor 40, the power controller 20 responds to deactivate at least one of the DC-to-DC converter 12 and the inverter 14, thereby stop feeding the power to the discharge lamp in order to avoid the lamp from flickering and therefore protect the electrical components of the converter and the inverter from undue stress. Alternatively, the power controller 20 may respond to shorten the ignition period of applying the high voltage to the lamp to such an extent hat the lamp is not substantially ignited.

After the detection time period ends, i.e., DTPD goes low, any extinction of the lamp cannot be detected as the lamp's life end and accordingly the demand signal is kept low, whereby the power controller 20 is enabled to operate normally. Thus, if the lamp is extinguished thereafter as a consequence of that, for example, an accidental drop in the input voltage or unstable arc discharge arc caused by physical shocks or vibrations as is seen when an automobile equipped with the lamp is running a bumpy road, the power controller 20 responds to re-ignited the lamp in order to keep operating the lamp normally.

As shown in FIG. 4, when there is a drop in the input voltage within the detection time, i.e., the input voltage Vin decreased below V1 within the detection time, the lighting signal LGT goes low and at the same time that the forced lamp extinction signal FEXT goes high. The high level FEXT is processed in the supervisor 40 so that the flip-flop 43 provides the low level demand signal which is an enable signal for permitting the power controller 20 to resume its operation of igniting the lamp. In response to the enable signal, the power controller 20 acts to provide the detection time period signal DTPD, the starting time period signal STPD, the reset signal RST, reestablishing the detection time period, the start time period for detection of the lamp's life end during the updated detection time period. In this manner, the lamp extinction due to the accidental drop in the input voltage during the detection time period can be disregarded in determining the lamp's life end, and another fresh detection time is provided for reliable detection of the lamp's life end Although the above embodiment is configured so that the supervisor 40 is prohibited from issuing the high level demand signal (disable signal) while the forced lamp extinction signal FEXT is high, it is equally possible to deactivate the lamp life detector 30 itself while the forced lamp extinction signal FEXT is high.

Further, the lamp current detector 24 and the lamp voltage detector 26 may be located in other positions than those illustrated in FIG. 1.

What is claimed is:

1. A ballast for a discharge lamp, said ballast comprising:
   a power supply providing from a power source a variable power to said discharge lamp;
   a power controller controlling said power supply to apply a high voltage for igniting said discharge lamp and subsequently apply a predetermined power for operating said discharge lamp;
   a lamp life detector detecting whether or not the lamp comes to a lamp's life end;
   a supervisor which issues a disable signal upon detection of the lamp's life end, said disable signal prohibiting said power supply from lighting said discharge lamp, wherein
      said power controller provides a detection period of a limited short time period starting from energization of said ballast such that said lamp life detector detects the lamp's life end and issues a lamp's life end signal only when there is an extinction of said discharge lamp within said detection period;
      said supervisor issues an enable signal after the elapse of said detection period, said enable signal permitting said power supply to ignite said discharge lamp if the lamp is extinguished after the elapse of said detection period.

2. The ballast as set forth in claim 1, wherein
   said disable signal causes said power supply to stop feeding said power to said discharge lamp.

3. The ballast as set forth in claim 1, wherein
   said disable signal causes said power supply to shorten a period of applying the high voltage to said discharge lamp to such an extent as to fail to re-ignite said discharge lamp.

4. The ballast as set forth in claim 1, wherein said detection period ranges from 1 to 60 seconds.

5. The ballast as set forth in claim 1, wherein
   said power controller provides an ignition period within which said power supply is permitted to apply the high voltage to said discharge lamp, said ignition period starting from the energization of said ballast and being shorter than said detection period,
   said lamp life detector not issuing said lamp's life end signal when an event which would otherwise be detected as the lamp's life end occurs within said ignition period.

6. The ballast as set forth in claim 1, further including
   an input voltage monitor for monitoring an input voltage supplied to the power supply,
   said power controller determining, based upon said input voltage as well as operating conditions of the lamp, whether or not a forced lamp extinction comes from a drop in said input voltage and provides a forced lamp extinction signal indicative of that the lamp is caused to extinct due to the drop in said input voltage,
   said supervisor, upon receiving said forced lamp extinction signal within said detection period, canceling said disable signal.

7. The ballast as set forth in claim 5, further including
   an input voltage monitor for monitoring an input voltage supplied to the power supply,
   said power controller determining, based upon said input voltage as well as operating conditions of the lamp, whether or not a forced lamp extinction comes from a drop in said input voltage and provides a forced lamp extinction signal indicative of that the lamp is caused to extinct due to the drop in said input voltage,
   said supervisor, upon receiving said forced lamp extinction signal within said detection period, canceling said disable signal.

8. The ballast as set forth in claim 1, wherein
   said lamp life detector provides said lamp's life end signal when said power supply sees a lamp voltage above a predetermined level.

9. The ballast as set forth in claim 1, wherein
   said lamp life detector provides said lamp's life end signal when said power supply sees a lamp current below a predetermined level.

10. The ballast as set forth in claim 7,
    said lamp life detector provides said lamp's life end signal when said power supply sees a lamp voltage above a predetermined level.

11. A method for controlling ballast for a discharge lamp, said method comprising the steps of:
    providing from a power supply a variable power to said discharge lamp;
    controlling said power supply to apply a high voltage for igniting said discharge lamp and subsequently apply a predetermined power for operating said discharge lamp;
    detecting whether or not the lamp comes to a lamp's life end; and
    issuing a disable signal upon detection of the lamp's life end, said disable signal prohibiting said power supply from lighting said discharge lamp; wherein
       said step of controlling said power supply includes providing a detection period of a limited short time period starting from energization of said ballast, and said step of detecting includes detecting the lamp's life end and issuing a lamp's life end signal only when there is an extinction of said discharge lamp within said detection period, and
       said step of issuing includes issuing an enable signal after the elapse of said detection period, said enable signal permitting said power supply to ignite said discharge lamp if the lamp is extinguished after the elapse of said detection period.

12. The method as set forth in claim 11, wherein
    said disable signal causes said power supply to stop feeding said power to said discharge lamp.

13. The method as set forth in claim 11, wherein
    said disable signal causes said power supply to shorten a period of applying the high voltage to said discharge lamp to such an extent as to fail to re-ignite said discharge lamp.

14. The method as set forth in claim 11, wherein
    said detection period ranges from 1 to 60 seconds.

15. The method as set forth in claim 11, wherein
    said step of controlling said power supply includes providing an ignition period within which said power supply is permitted to apply the high voltage to said discharge lamp, said ignition period starting from the energization of said ballast and being shorter than said detection period, and said lamp's life end signal is not issued when there is acknowledged within said ignition period an event which would otherwise be detected as the lamp's life end.

16. The method as set forth in claim 11, further comprising:

monitoring an input voltage supplied to the power supply;

determining, based upon said input voltage as well as operating conditions of the lamp, whether or not a forced lamp extinction comes from a drop in said input voltage;

providing a forced lamp extinction signal indicating that the lamp extinction is due to the drop in said input voltage; and canceling said disable signal upon receiving said forced lamp extinction signal within said detection period.

17. The method as set forth in claim 15, further comprising:

monitoring an input voltage supplied to the power supply;

determining, based upon said input voltage as well as operating conditions of the lamp, whether or not a forced lamp extinction comes from a drop in said input voltage;

providing a forced lamp extinction signal indicating that the lamp extinction is due to the drop in said input voltage; and canceling said disable signal upon receiving said forced lamp extinction signal within said detection period.

18. The method as set forth in claim 11, wherein said step of detecting whether or not the lamp comes to a lamp's life end comprises providing said lamp's life end signal when said power supply sees a lamp voltage above a predetermined level.

19. The method as set forth in claim 11, further comprising:

providing said lamp's life end signal when said power supply sees a lamp current below a predetermined level.

20. The method as set forth in claim 17, further comprising:

providing said lamp's life end signal when said power supply sees a lamp voltage above a predetermined level.

* * * * *